(12) United States Patent
Seo et al.

(10) Patent No.: US 9,008,011 B2
(45) Date of Patent: *Apr. 14, 2015

(54) METHOD AND APPARATUS FOR TRANSMITTING HARQ ACK/NACK SIGNAL IN MULTI-ANTENNA SYSTEM

(75) Inventors: Dong Youn Seo, Anyang-si (KR); Min Gyu Kim, Anyang-si (KR); Dae Won Lee, Anyang-si (KR); Suck Chel Yang, Anyang-si (KR); Joon Kui Ahn, Anyang-si (KR); Jung Hoon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 433 days.

This patent is subject to a terminal disclaimer.

(21) Appl. No.: 13/254,762

(22) PCT Filed: Mar. 3, 2010

(86) PCT No.: PCT/KR2010/001327
§ 371 (c)(1),
(2), (4) Date: Oct. 26, 2011

(87) PCT Pub. No.: WO2010/101411
PCT Pub. Date: Sep. 10, 2010

(65) Prior Publication Data
US 2012/0039285 A1 Feb. 16, 2012

Related U.S. Application Data

(60) Provisional application No. 61/157,199, filed on Mar. 3, 2009, provisional application No. 61/178,484, filed on May 14, 2009, provisional application No. 61/236,527, filed on Aug. 25, 2009, provisional (Continued)

(30) Foreign Application Priority Data

Mar. 2, 2010 (KR) .................. 10-2010-0018597

(51) Int. Cl.
*H04W 4/00* (2009.01)
*H04L 1/18* (2006.01)
(Continued)

(52) U.S. Cl.
CPC ............. *H04L 1/1887* (2013.01); *H04L 1/0003* (2013.01); *H04L 1/1671* (2013.01);
(Continued)

(58) Field of Classification Search
CPC ... H04L 1/1864; H04L 5/0618; H04L 1/1671; H04L 5/0053; H04L 1/1825; H04L 1/1887
See application file for complete search history.

(56) References Cited

U.S. PATENT DOCUMENTS

| | | | | |
|---|---|---|---|---|
| 8,634,370 | B2 * | 1/2014 | Yu et al. ...................... | 370/329 |
| 2008/0095109 | A1 * | 4/2008 | Malladi et al. ................ | 370/330 |

(Continued)

FOREIGN PATENT DOCUMENTS

| | | |
|---|---|---|
| CN | 101043303 A | 9/2007 |
| CN | 101116300 A | 1/2008 |

(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)," 3GPP TS 36.213, V.8,5.0, Dec. 2008, 74 pages.

(Continued)

*Primary Examiner* — Omer S Mian
(74) *Attorney, Agent, or Firm* — Birch, Stewart, Kolasch & Birch, LLP

(57) ABSTRACT

A method and apparatus of transmitting an ACK/NACK signal for a hybrid automatic repeat request (HARQ) in a wireless communication system is provided. A first ACK/NACK resource index and a second ACK/NACK resource index based on resources used to transmit a downlink control channel is determined. An ACK/NACK signal for a downlink transport block is transmitted through a plurality of antennas using first ACK/NACK resources obtained from the first ACK/NACK resource index and second ACK/NACK resources obtained from the second ACK/NACK resource index. An HARQ ACK/NACK signal can be reliably transmitted through a plurality of antennas.

4 Claims, 14 Drawing Sheets

Related U.S. Application Data application No. 61/239,409, filed on Sep. 2, 2009, provisional application No. 61/243,143, filed on Sep. 16, 2009, provisional application No. 61/249,996, filed on Oct. 8, 2009, provisional application No. 61/250,554, filed on Oct. 11, 2009.

(51) Int. Cl.

| | | |
|---|---|---|
| *H04L 1/16* | (2006.01) | |
| *H04L 1/06* | (2006.01) | |
| *H04L 1/00* | (2006.01) | |
| *H04L 5/00* | (2006.01) | |
| *H04L 1/12* | (2006.01) | |
| *H04W 28/04* | (2009.01) | |
| *H04W 72/04* | (2009.01) | |

(52) U.S. Cl.
CPC ............ *H04L1/1861* (2013.01); *H04L 1/1896* (2013.01); *H04L 5/0023* (2013.01); *H04L 5/0053* (2013.01); *H04L 5/0055* (2013.01); *H04L 2001/125* (2013.01); *H04W 28/04* (2013.01); *H04W 72/04* (2013.01); *H04L 1/0668* (2013.01)

(56) References Cited

U.S. PATENT DOCUMENTS

| | | |
|---|---|---|
| 2008/0141093 A1 | 6/2008 | Kwon et al. |
| 2008/0175195 A1 | 7/2008 | Cho et al. |
| 2008/0212506 A1 | 9/2008 | Lee et al. |
| 2009/0055703 A1 | 2/2009 | Kim et al. |
| 2009/0201869 A1* | 8/2009 | Xu et al. .................. 370/329 |
| 2010/0039997 A1* | 2/2010 | Ratasuk et al. ............. 370/329 |
| 2011/0280211 A1* | 11/2011 | Zhang et al. ................ 370/329 |

FOREIGN PATENT DOCUMENTS

| | | |
|---|---|---|
| EP | 2 391 167 A1 | 11/2011 |
| KR | 10-2008-0065890 A | 7/2008 |
| KR | 10-2008-0088127 A | 10/2008 |
| RU | 2 233 543 C2 | 7/2004 |
| WO | WO 00/62456 A1 | 10/2000 |
| WO | WO 2006/071050 A1 | 7/2006 |
| WO | WO 2007/044414 A1 | 4/2007 |
| WO | WO 2008/115004 A2 | 9/2008 |
| WO | WO 2010/084901 A1 | 7/2010 |

OTHER PUBLICATIONS

Motorola, "Introduction of Rel-10 LTE-Advanced features in 36.213," Draft Change Request, 3GPP TSG-RAN Meeting #62, R1-105111, Aug. 23-27, 2010, 84 pages.

* cited by examiner

METHOD AND APPARATUS FOR TRANSMITTING HARQ ACK/NACK SIGNAL IN MULTI-ANTENNA SYSTEM

This application is a National Phase of PCT/KR2010/001327 filed on Mar. 3, 2010, which claims priority under 35 USC 119(e) to US Provisional Application Nos. 61/157,199, 61/178,484, 61/236,527, 61/239,409, 61/243,143, 61/249,996 and 61/250,554 filed on Mar. 3, 2009, May 14, 2009, Aug. 25, 2009, Sep. 2, 2009, Sep. 16, 2009, Oct. 8, 2009 and Oct. 11, 2009, respectively and under 35 USC 119(a) to Patent Application No. 10-2010-0018597 filed in Republic of Korea, on Mar. 2, 2010, all of which are hereby expressly incorporated by reference into the present application.

TECHNICAL FIELD

The present invention relates to wireless communication, and more particularly, to a method and apparatus for performing an HARQ (Hybrid Automatic Repeat Request) in a wireless communication system.

BACKGROUND ART

Long term evolution (LTE) based on 3rd generation partnership project (3GPP) technical specification (TS) release 8 is a promising next-generation mobile communication standard.

As disclosed in 3GPP TS 36.211 V8.5.0 (2008-12) "Evolved Universal Terrestrial Radio Access (E-UTRA); Physical Channels and Modulation (Release 8)", a physical channel of the LTE can be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

A PDCCH (i.e., a downlink control channel) carries a downlink grant for receiving the PDSCH of a UE (UE) and an uplink grant for transmitting the PUSCH of a UE. A PUCCH (i.e., an uplink control channel) carries an uplink control signal (e.g., ACK (positive-acknowledgement)/NACK (negative-acknowledgement) signals for a HARQ), a CQI (Channel Quality Indicator) indicating the condition of a downlink channel, an SR (Scheduling Request) for requesting the allocation of radio resources for uplink transmission, and so on.

To guarantee a higher data rate, a technique using a multi-antenna has been introduced.

An HARQ based on the physical channels of the existing 3GPP LTE is performed by taking transmission using a single antenna into consideration. However, if HARQ based on single antenna transmission is applied to a multi-antenna without change, the execution of an HARQ may not be efficient.

Accordingly, there is a need for a method and apparatus capable of performing an HARQ in a multi-antenna system.

DISCLOSURE OF INVENTION

Technical Problem

The present invention provides a method and apparatus for performing an HARQ using a plurality of resources and a plurality of antennas.

The present invention also provides a method and apparatus for transmitting an HARQ ACK/NACK signal using a plurality of resources and a plurality of antennas.

The present invention also provides a method and apparatus for acquiring a plurality of resources used to transmit an HARQ ACK/NACK signal using a plurality of antennas.

Solution to Problem

In an aspect, a method of transmitting an ACK/NACK signal for a hybrid automatic repeat request (HARQ) in a wireless communication system is provided. The method includes receiving, at a user equipment (UE), a downlink transport block through downlink allocation indicated by a downlink control channel, determining, at the UE, a first ACK/NACK resource index and a second ACK/NACK resource index based on resources used to transmit the downlink control channel, and transmitting, at the UE, an ACK/NACK signal for the downlink transport block through a plurality of antennas using first ACK/NACK resources obtained from the first ACK/NACK resource index and second ACK/NACK resources obtained from the second ACK/NACK resource index. The second ACK/NACK resource index may be determined based on the first ACK/NACK resource index.

The resources used to transmit the downlink control channel may include at least one control channel element (CCE), and the first ACK/NACK resource index may be determined based on a lowest CCE index of CCE indices for the at least one CCE.

The second ACK/NACK resource index may be determined based on a CCE index subsequent to the lowest CCE index.

The second ACK/NACK resource index may be determined based a CCE index previous to the lowest CCE index.

The second ACK/NACK resource index may be determined by adding an offset to the first ACK/NACK resource index.

In another aspect, an apparatus for transmitting an ACK/NACK signal for an HARQ in a wireless communication system is provided. The apparatus includes a radio frequency unit configured to transmit and receive a radio signal, and a processor operatively coupled to the radio frequency unit. The processor is configured to receive a downlink transport block through downlink allocation indicated by a downlink control channel, determine a first ACK/NACK resource index and a second ACK/NACK resource index based on resources used to transmit the downlink control channel, and transmit an ACK/NACK signal for the downlink transport block through a plurality of antennas using first ACK/NACK resources obtained from the first ACK/NACK resource index and second ACK/NACK resources obtained from the second ACK/NACK resource index. The processor is configured to determine the second ACK/NACK resource index based on the first ACK/NACK resource index.

Advantageous Effects of Invention

An HARQ ACK/NACK signal can be reliably transmitted through a plurality of antennas.

MODE FOR THE INVENTION

Figure 1:
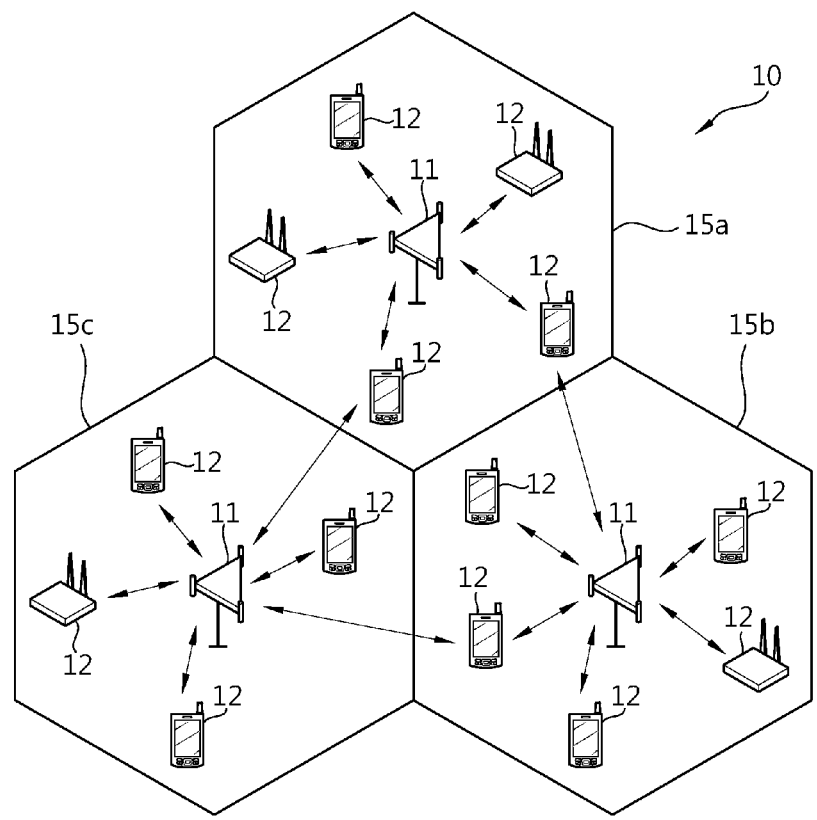
FIG. 1 is a diagram showing a wireless communication system.

FIG. 1 is a diagram showing a wireless communication system. A wireless communication system 10 includes one or more base stations (BSs) 11. Each of the BSs 11 provides communication services to a specific geographical area (in general referred to as a cell) 15a, 15b, or 15c. Each of the cells can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink implies communication from the BS to the UE, and uplink implies communication from the UE to the BS. In the downlink, a transmitter may be a part of the BS, and a receiver may be a part of the MS. In the uplink, the transmitter may be a part of the UE, and the receiver may be a part of the BS.

Figure 2:
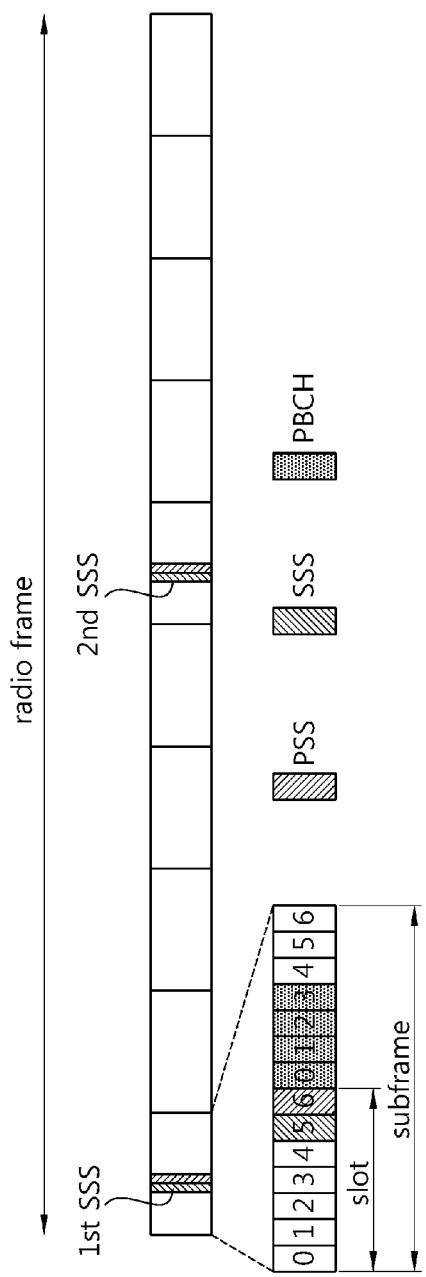
FIG. 2 is a diagram showing the structure of a radio frame in the 3GPP LTE.

FIG. 2 is a diagram showing the structure of a radio frame in the 3GPP LTE. The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A primary synchronization signal (PSS) is transmitted in last OFDM symbols of a 1st slot, i.e., a 1st slot of a 1st subframe (a subframe indexed with 0), and an 11th slot, i.e., a 1st slot of a 6th subframe (a subframe indexed with 5). The PSS is used to obtain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to a cell ID. The same PSC is used for each of the last OFDM symbols of the 1st slot and the 11th slot.

A secondary synchronization signal (SSS) includes a 1st SSS and a 2nd SSS. The 1st SSS and the 2nd SSS are transmitted in an OFDM symbol adjacent to an OFDM symbol in which the PSS is transmitted. The SSS is used to obtain frame synchronization. The SSS is used to obtain a cell ID together with the PSS. The 1st SSS and the 2nd SSS use different secondary synchronization codes (SSCs). If the 1st SSS and the 2nd SSS each include 31 subcarriers, sequences of two SSCs with a length of 31 are respectively used for the 1st SSS and the 2nd SSS.

A physical broadcast channel (PBCH) is transmitted in four preceding OFDM symbols of a 2nd slot of the 1st subframe. The PBCH carries necessary system information required by a UE to communicate with a BS. System information transmitted through the PBCH is referred to as a master information block (MIB). In comparison thereto, system information transmitted through a physical downlink control channel (PDCCH) is referred to as a system information block (SIB).

As disclosed in 3GPP TS 36.211 V8.5.0 (2008-12), the LTE classifies a physical channel into a data channel, i.e., a physical downlink shared channel (PDSCH) and a physical uplink shared channel (PUSCH), and a control channel, i.e., a physical downlink control channel (PDCCH) and a physical uplink control channel (PUCCH). Further, there is a downlink control channel, i.e., a physical control format indicator channel (PCFICH) and a physical hybrid-ARQ indicator channel (PHICH).

Figure 3:
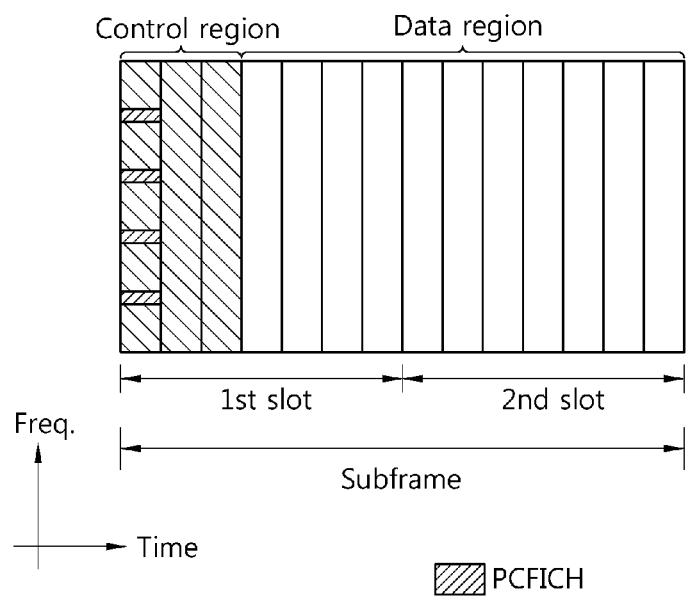
FIG. 3 is a diagram showing the structure of a downlink subframe in the 3GPP LTE.

FIG. 3 is a diagram showing the structure of a downlink subframe in the 3GPP LTE. A subframe is divided into a control region and a data region in a time domain. The control region includes up to three preceding OFDM symbols of a 1st slot in the subframe. The number of OFDM symbols included in the control region may vary. A PDCCH is allocated to the control region, and a PDSCH is allocated to the data region.

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

A PCFICH transmitted in a 1st OFDM symbol in the subframe carries information regarding the number of OFDM symbols (i.e., a size of the control region) used for transmission of control channels in the subframe.

A PHICH carries an acknowledgement (ACK)/not-acknowledgement (NACK) signal for uplink hybrid automatic repeat request (HARM). That is, the ACK/NACK signal for uplink data transmitted by the UE is transmitted over the PHICH.

Figure 4:
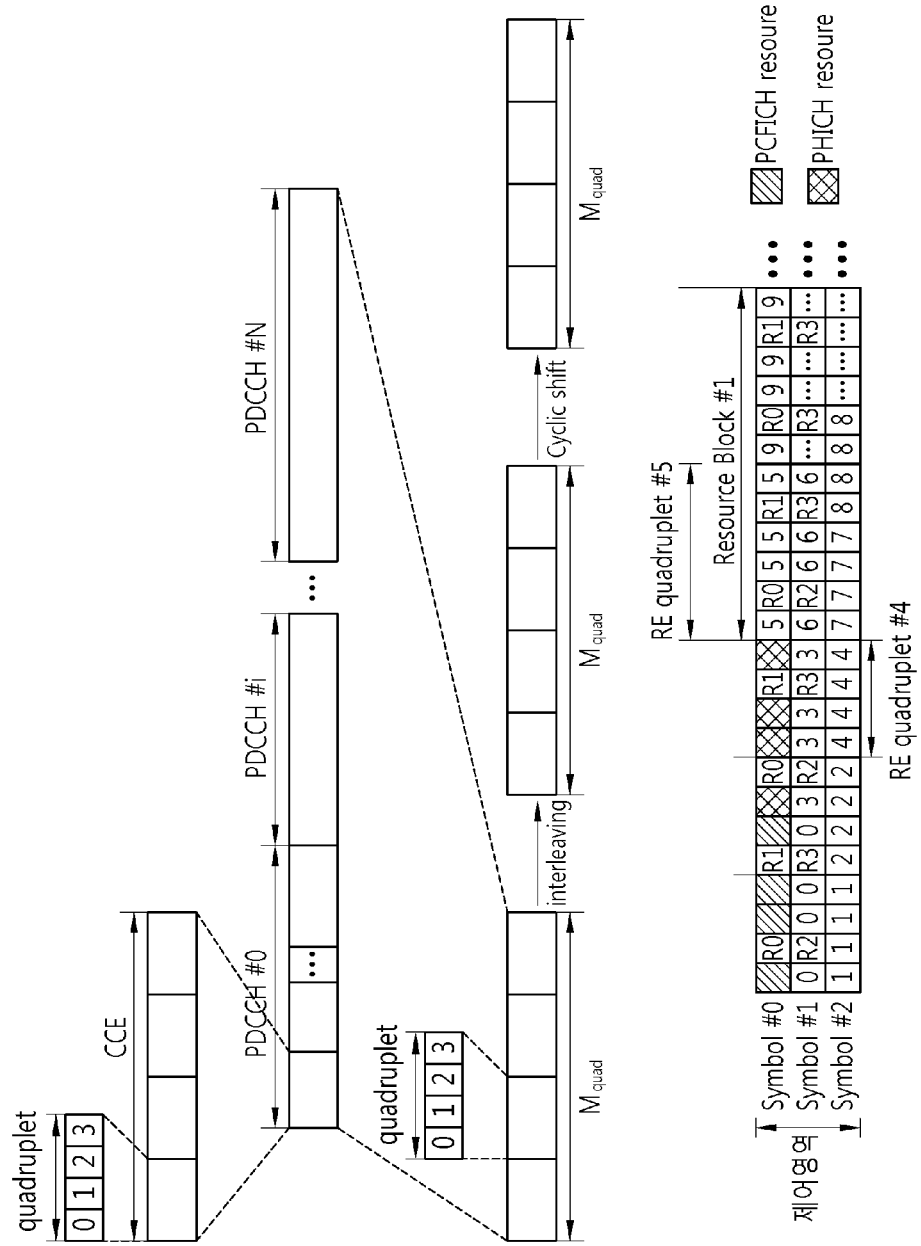
FIG. 4 is a diagram showing an example of the resource mapping of PDCCHs.

FIG. 4 is a diagram showing an example of the resource mapping of PDCCHs. The section 6 of 3GPP TS 36.211 V8.5.0 (2008-12) may be incorporated herein by reference. R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruple in FIG. 4) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

Figure 5:
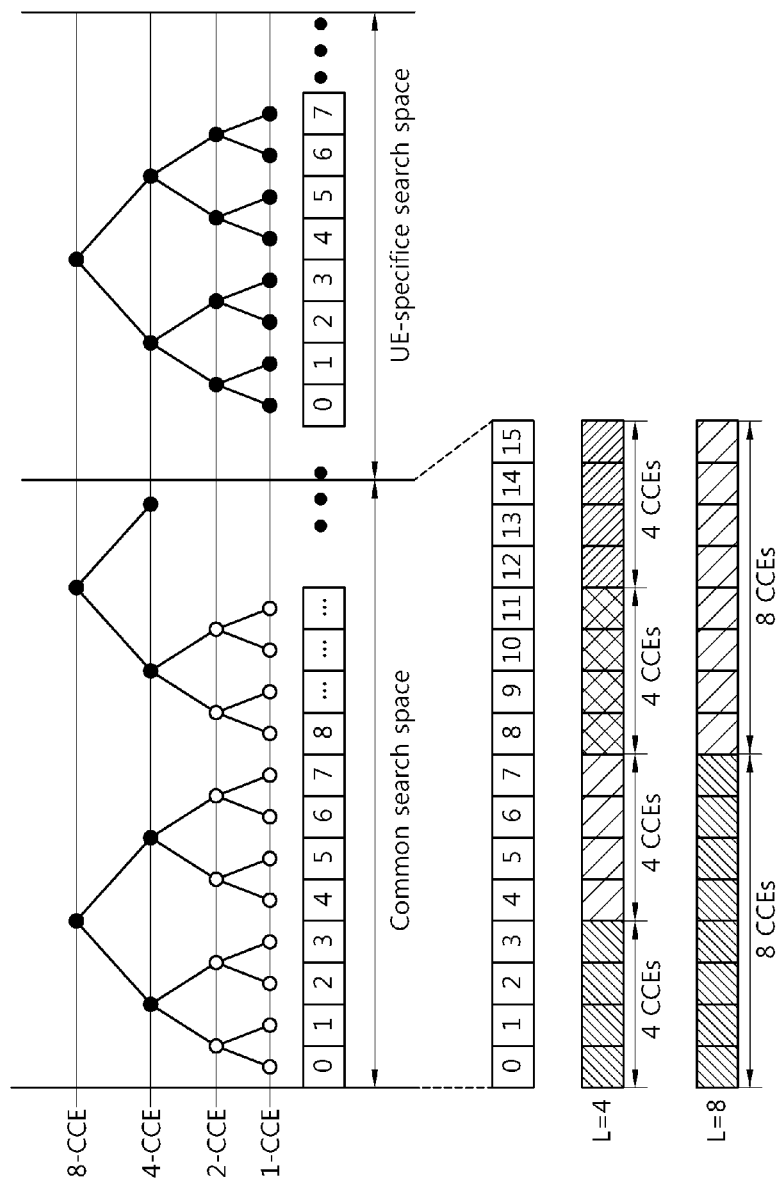
FIG. 5 is an exemplary view showing the monitoring of PDCCHs.

FIG. 5 is an exemplary view showing the monitoring of PDCCHs. For the monitoring of PDCCHs, reference can be made to section 9 of 3GPP TS 36.213 V8.5.0 (2008-12). In the 3GPP LTE, blind decoding is used to detect PDCCHs. Blind decoding is a method of demasking a specific ID for the CRC of a received PDCCH (referred to a candidate PDCCH) and checking CRC error in order to determine whether the corresponding PDCCH is its own control channel. A UE does not know that its own PDCCH is transmitted using which CCE aggregation level or which DCI format at which position within the control region.

A plurality of PDCCHs can be transmitted in one subframe. A UE monitors the plurality of PDCCHs every subframe. Monitoring is an operation of attempting PDCCH decoding by the UE according to a format of the monitored PDCCH.

The 3GPP LTE uses a search space to reduce an overload caused by blind decoding. The search space can be called a monitoring set of CCEs for PDCCHs. A UE monitors the PDCCHs within a corresponding search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. The UE-specific search space supports a PDCCH having a CCE aggregation level of {1, 2, 4, 8}.

A method of transmitting an ACK/NACK signal through the PUCCH in the 3GPP LTE is described below.

Figure 6:
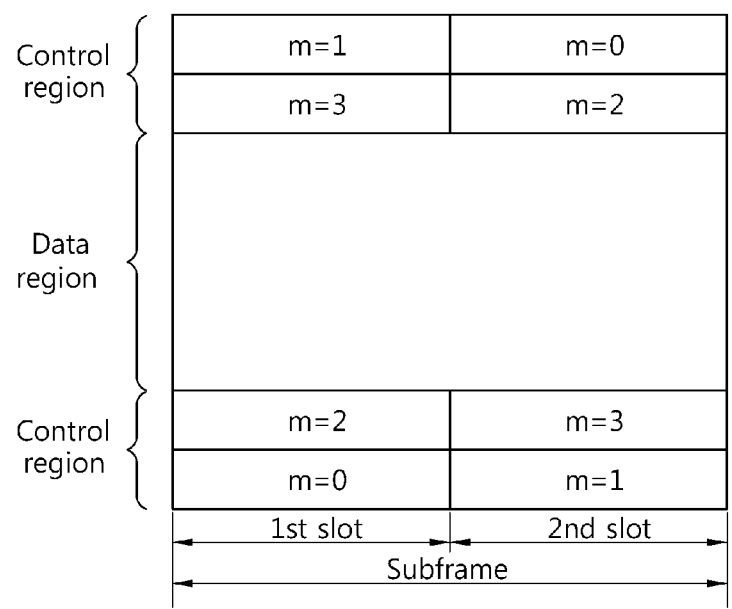
FIG. 6 is a diagram showing an example of an uplink subframe in the 3GPP LTE.
Figure 6:
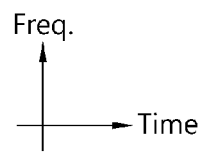

FIG. 6 is a diagram showing an example of an uplink subframe in the 3GPP LTE. The uplink subframe can be divided into a control region to which a physical uplink control channel (PUCCH) carrying uplink control information is allocated and a data region to which a physical uplink shared channel (PUSCH) carrying uplink data is allocated. A PUCCH for a UE is allocated in a pair of resource blocks in a subframe. Resources blocks belonging to the resource block-pair occupy different subcarriers in a first slot and a second slot. In FIG. 6, m is a position index indicating a logical frequency region position of the resource block pair, allocated to PUCCHs within the uplink subframe. FIG. 6 shows that resource blocks having the same m value occupy different subcarriers in the two slots.

In accordance with 3GPP TS 36.211 V8.5.0 (2008-12), a PUCCH supports a multiple formats. PUCCHs having different numbers of bits per subframe can be used in accordance with a modulation scheme dependent on a PUCCH format.

The table 1 shows an example of modulation schemes and the number of bits per subframe according to PUCCH formats.

TABLE 1

| PUCCH Format | Modulation Scheme | Number of Bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used to transmit an SR (Scheduling Request), the PUCCH formats 1a/1b are used to transmit an ACK/NACK signal for an HARQ, the PUCCH format 2 is used to transmit a CQI, and each of the PUCCH formats 2a/2b is used to simultaneously transmit a CQI and an ACK/NACK signal. When only the ACK/NACK signal is transmitted in a subframe, the PUCCH formats 1a/1b are used, but when only the SR is transmitted in a subframe, the PUCCH format 1 is used. When the SR and the ACK/NACK signal are simultaneously transmitted, the PUCCH format 1 is used. The ACK/NACK signal modulated in resources to which the SR has been allocated is transmitted.

Each of all the PUCCH formats uses the cyclic shift (CS) of a sequence in each OFDM symbol. The cyclic-shifted sequence is generated by cyclically shifting a base sequence by a specific CS amount. The specific CS amount is indicated by a CS index.

An example in which the base sequence $r_u(n)$ is defined is shown as:

MathFigure 1

$$r_u(n) = e^{jb(n)\pi/4} \quad \text{[Math.1]}$$

where μ indicates a root index, n indicates an element index where $0 \leq n \leq N-1$, and N indicates the length of the base sequence. b(n) is defined in 3GPP TS 36.211 V8.5.0 (2008-12).

The length of the base sequence is equal to the number of elements included in the base sequence. μ can be determined based on a cell ID (identifier) or a slot number within a radio frame. Assuming that the base sequence is mapped to one resource block in the frequency domain, the length of the base sequence N is 12 because one resource block includes 12 subcarriers. A different base sequence can be defined on the basis of a different root index.

A cyclic-shifted sequence $r(n, I_{cs})$ can be generated by cyclically shifting a base sequence r(n) as shown:

MathFigure 2

$$r(n, I_{cs}) = r(n) \cdot \exp\left(\frac{j2\pi I_{cs} n}{N}\right), \quad \text{[Math. 2]}$$
$$0 \leq I_{cs} \leq N - 1$$

where $I_{cs}$ is a CS index indicating the CS amount ($0 \leq I_{cs} \leq N-1$).

Hereinafter, available CS indices of the base sequence refer to CS indices that can be derived from the base sequence on the basis of a CS interval. For example, assuming that the length of the base sequence is 12 and the CS interval is 1, a total number of available CS indices of the base sequence is 12. Assuming that the length of the base sequence is 12 and the CS interval is 2, the number of available CS indices of the base sequence is 6.

A method of transmitting the HARQ ACK/NACK signal in the PUCCH formats 1/1a/1b (hereinafter collectively referred to as a PUCCH format 1) is described below.

Figure 7:
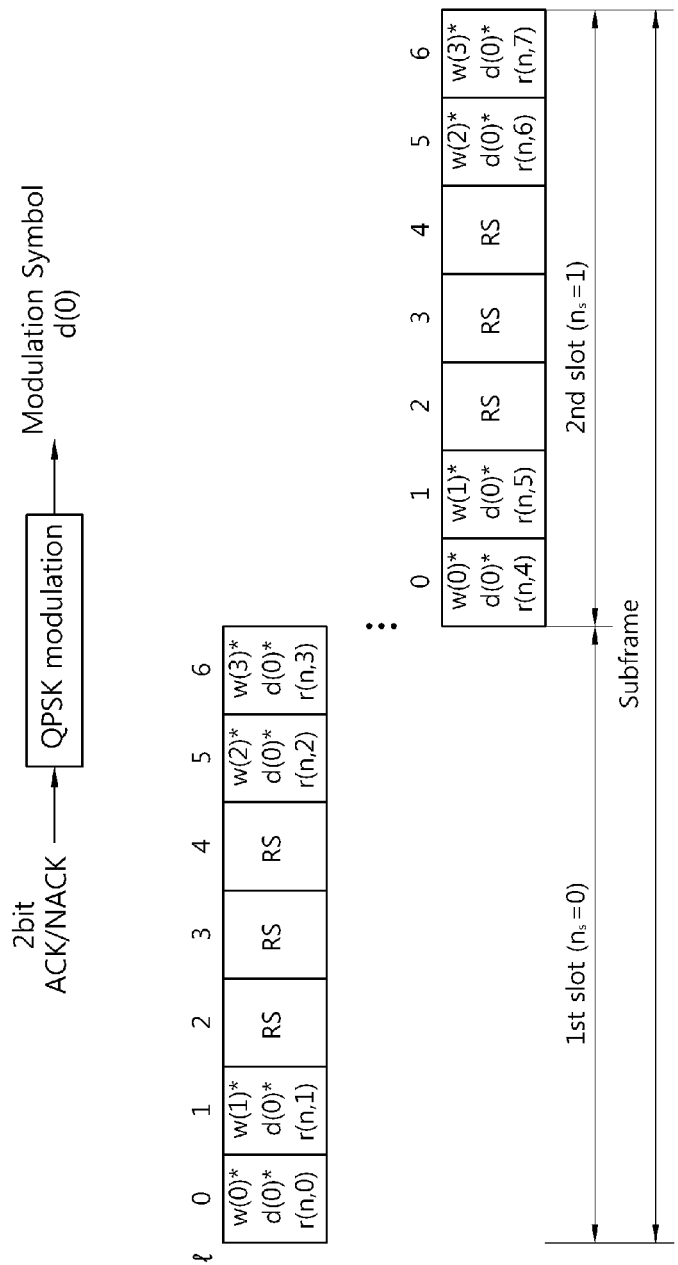
FIG. 7 is a diagram showing a PUCCH format 1 in a normal CP in the 3GPP LTE.
Figure 8:
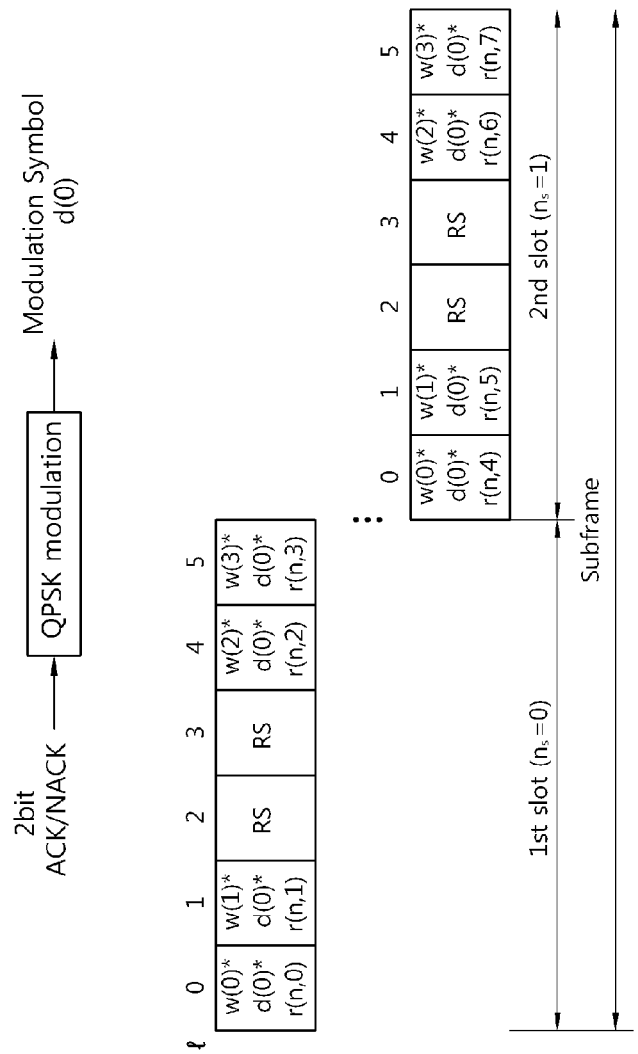
FIG. 8 is a diagram showing a PUCCH format 1 in an extended CP in the 3GPP LTE.

FIG. 7 is a diagram showing the PUCCH format 1 in a normal CP in the 3GPP LTE. FIG. 8 is a diagram showing the PUCCH format 1 in an extended CP in the 3GPP LTE. The normal CP and the extended CP have different positions and different numbers of reference signals (RSs) because they include different numbers of OFDM symbols in one slot, but have the same ACK/NACK transmission structure.

A modulation symbol d(0) is generated by modulating an 1-bit ACK/NACK signal through BPSK (Binary Phase Shift Keying) or a 2-bit ACK/NACK signal through QPSK (Quadrature Phase Shift Keying).

In the normal CP or the extended CP, one slot includes 5 OFDM symbols for transmitting the ACK/NACK signal. One subframe includes 10 OFDM symbols for transmitting the ACK/NACK signal. The modulation symbol d(0) is spread with a cyclic-shifted sequence $r(n, I_{cs})$. Assuming 1-dimensional spread sequence corresponding to an (i+1)th OFDM symbol in a subframe is m(i), {m(0), m(1), . . . , m(9)}={d(0) $r(n, I_{cs})$, d(0)$r(n, I_{cs})$, . . . , d(0)$r(n, I_{cs})$}.

To increase UE capacity, the 1-dimensional spread sequence can be spread using an orthogonal sequence.

An orthogonal sequence $w_i(k)$, where i is a sequence index and $0 \leq k \leq K-1$, having a spreading factor K=4 may use the following sequence.

TABLE 2

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The orthogonal sequence $w_i(k)$, where i is a sequence index and $0 \leq k \leq K-1$, having a spreading factor K=3 may use the following sequence.

TABLE 3

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used for each slot. In the 3GPP LTE, the last OFDM symbol within a subframe is used in order to transmit an SRS (sounding reference signal). Here, in a PUCCH, a first slot uses the spreading factor K=4 and a second slot uses the spreading factor K=3.

Accordingly, assuming that a certain orthogonal sequence index i is given, 2-dimensional spread sequences s(0), s(1), . . . , s(9) can be expressed as follows:

{s(0), s(1), . . . , s(9)}={$w_i(0)$m(0), $w_i(1)$m(1), $w_i(2)$m(2), $w_i(3)$m(3), $w_i(4)$m(4), $w_i(0)$m(5), $w_i(1)$m(7), $w_i(2)$m(8), $w_i(3)$m(9)}.

The CS index $I_{cs}$ can vary depending on a slot number ($n_s$) within a radio frame or a symbol index (l) within a slot or both. Assuming that the first CS index is 0 and the value of a CS index is increased by 1 every OFDM symbol, {s(0), s(1), . . . , s(9)}={$w_i(0)$d(0)r(n,0), $w_i(1)$d(1)r(n,1), $w_i(3)$d(9) r(n,9)} as shown in FIGS. 7 and 8.

The 2-dimensional spread sequences {s(0), s(1), . . . , s(9)} are subject to IFFT and then transmitted through corresponding resource blocks. Accordingly, the ACK/NACK signal is transmitted on the PUCCH.

The orthogonal sequence index i, the CS index $I_{cs}$, and the resource block index m are parameters necessary to constitute a PUCCH and also resources used to distinguish PUCCHs (or UEs) from each other. Assuming that the number of available CSs is 12 and the number of available orthogonal sequence indices is 3, PUCCHs for a total of 36 UE can be multiplexed to one resource block.

In the 3GPP LTE, in order for a UE to acquire the above three parameters for constituting the PUCCH, a resource index $n^{(1)}_{PUCCH}$ is defined. The resource index $n^{(1)}_{PUCCH} = n_{CCE} + N^{(1)}_{PUCCH}$. Here, $n_{CCE}$ is the number of first CCEs used to transmit a corresponding DCI (i.e., the allocation of downlink resources used to receive downlink data corresponding to an ACK/NACK signal), and $n^{(1)}_{PUUCH}$ is a parameter that a BS informs the UE through an upper layer message.

Consequently, it can be said that resources used to transmit a PUCCH are implicitly determined depending on the resources of a corresponding PDCCH. This is because a UE does not separately inform a BS of resources used to transmit a PUCCH for an ACK/NACK signal, but indirectly informs the BS of resources used for a PDCCH used to transmit downlink data.

Figure 9:
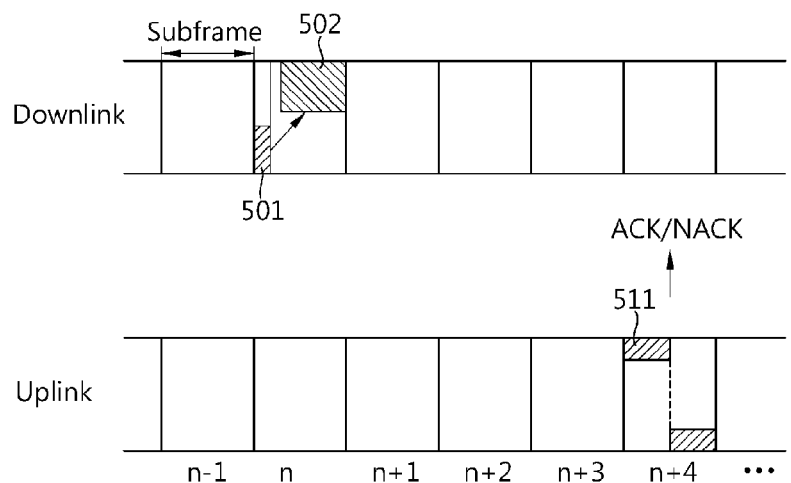
FIG. 9 is a diagram showing an example in which an HARQ is performed.

FIG. 9 is a diagram showing an example in which an HARQ is performed. A UE monitors PDCCHs and receives a PDCCH 501, including a downlink grant, in an n-th subframe. The UE receives a downlink transport block through a PDSCH 502 indicated by the downlink grant.

The UE transmits an ACK/NACK signal for the downlink transport block on the PUCCH 511 in an (n+4)th subframe. The ACK/NACK signal becomes an ACK signal if the downlink transport block is successfully decoded and a NACK signal if the downlink transport block is unsuccessfully decoded. When the NACK signal is received, a BS can retransmit the downlink transport block until the reception of an ACK signal or a maximum number of retransmissions.

To constitute the PUCCH 511, the UE uses resource allocation of the PDCCH 501. That is, the lowest CCE index used to transmit the PDCCH 501 becomes $n_{CCE}$, and a resource index, such as $n^{(1)}_{PUUCH} = n_{CCE} + N^{(1)}_{PUUCH}$, is determined.

A method of transmitting an ACK/NACK signal in a multi-antenna is described below.

Hereinafter, the time, frequency, and/or code resources used to transmit an ACK/NACK signal are referred to as ACK/NACK resources or PUCCH resources. As described above, the index of an ACK/NACK resource (also referred to as an ACK/NACK resource index or a PUCCH index) necessary to transmit the ACK/NACK signal on PUCCHs can be expressed into at least any one of the orthogonal sequence index i, the CS index $I_{cs}$, the resource block index m, and indices for finding the three indices. The ACK/NACK resource can include at least any one of an orthogonal sequence, a CS, a resource block, and a combination of them.

Although the ACK/NACK resource index is illustrated to be the above resource index $n^{(1)}_{PUUCH}$ in order to clarify the description, the configuration or expression of the ACK/NACK resource is not limited.

Figure 10:
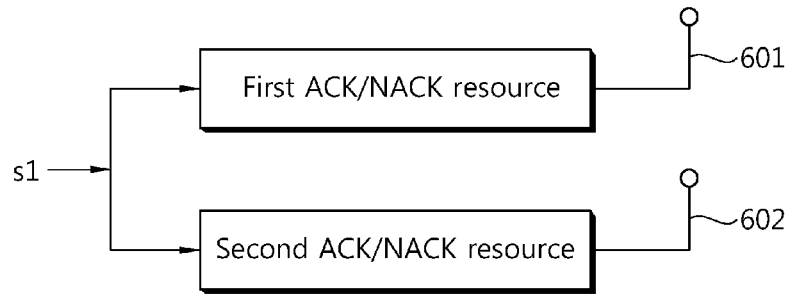
FIG. 10 is a diagram showing an example in which an ACK/NACK signal is transmitted in a multi-antenna.

FIG. 10 is a diagram showing an example in which an ACK/NACK signal is transmitted in a multi-antenna. A modulation symbol s1 of an ACK/NACK signal is transmitted through a first antenna 601 using a first ACK/NACK resource and transmitted through a second antenna 602 using second ACK/NACK resources.

A first orthogonal sequence index $i_1$, a first CS index $I_{cs1}$, and a first resource block index $m_1$ are determined based on a first ACK/NACK resource index, and a first PUCCH is configured based on the determined indices. A second orthogonal sequence index $i_2$, a second CS index $I_{cs2}$, and a second resource block index $m_2$ are determined based on a second ACK/NACK resource index, and a second PUCCH is configured based on the determined indices. The modulation symbol s1 is transmitted through the first antenna 601 on the first PUCCH and transmitted through the second antenna 602 on the second PUCCH.

Consequently, since the same ACK/NACK signal is transmitted through different antennas using different resources, transmit diversity gain can be obtained.

Figure 11:
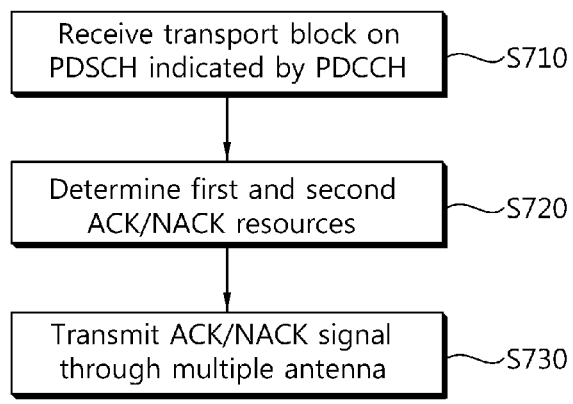
FIG. 11 is a flowchart illustrating a method of performing an HARQ according to an embodiment of the present invention.

FIG. 11 is a flowchart illustrating a method of performing an HARQ according to an embodiment of the present invention.

A UE receives a downlink transport block on PDSCHs indicated by PDCCHs at step S710.

The UE determines first and second ACK/NACK resources at step S720. A method of determining a plurality of the ACK/NACK resources is described later.

The UE transmits an HARQ ACK/NACK signal for the downlink transport block using the first and second ACK/NACK resources through a plurality of antennas at step S730.

The method of determining a plurality of ACK/NACK resources is described below. The number of necessary ACK/NACK resources is less than or equal to the number of antennas.

Although the two ACK/NACK resources are illustrated to be used in the two antennas in order to clarify the description, the technical spirit of the present invention is not limited to the number of ACK/NACK resources or the number of antennas.

In the conventional 3GPP LTE, ACK/NACK resources are determined on the basis of resources used to transmit PDCCHs. In other words, a resource index (i.e., an index of the ACK/NACK resources) is determined on the basis of the lowest CCE index used to transmit a PDCCH. In the proposed methods, the first ACK/NACK resources are determined like the conventional 3GPP LTE, but schemes for determining the remaining second ACK/NACK resources are disclosed.

Figure 12:
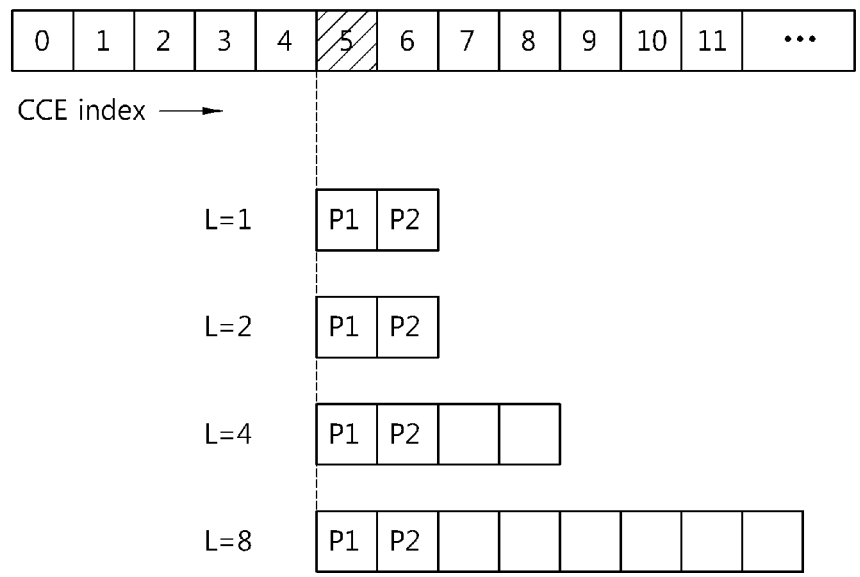
FIG. 12 is a diagram showing a method of determining a plurality of resources according to a first embodiment of the present invention.

FIG. 12 is a diagram showing a method of determining a plurality of resources according to a first embodiment of the present invention. In this method, the second ACK/NACK resources are determined on the basis of a CCE index next to the lowest CCE index.

It is assumed that a CCE index 5 used to transmit a PDCCH for a downlink grant, from among CCE indices, is the lowest index. If the CCE aggregation level L is 1, a first ACK/NACK resource index P1 is determined on the basis of the lowest CCE index 5 as in the existing method, and a second ACK/NACK resource index P2 is determined on the basis of an index 6 subsequent to the lowest CCE index 5. The same principle is applied to CCE aggregation levels L=2, 4, and 8.

If the CCE index next to the lowest CCE index is larger than $N_{CCE}-1$, the CCE index next to the lowest CCE index may be set to 0 by using cyclic shift. $N_{CCE}$ is the total number of CCEs. The same principle may be applied to later embodiments.

In other words, the first and second ACK/NACK resource indices P1 and P2 may respectively be defined as $P1 = n_{CCE} + N^{(1)}_{PUUCH}$ and $P2 = (n_{CCE}+1) + N^{(1)}_{PUUCH}$, respectively, irrespective of their CCE aggregation levels.

Although the second ACK/NACK resource index P2 is illustrated to be determined on the basis of an index subsequent to the lowest CCE index, the second ACK/NACK resource index P2 may be determined using $(n_{CCE}+b) + N^{(1)}_{PUUCH}$, more generally. Here, b is an integer.

The determined second ACK/NACK resource index P2 may be larger than largest available ACK/NACK resource index. For example, available ACK/NACK resource indexes are ranged from 0 to $N_{CCE}-1$. The second ACK/NACK resource index P2 may be cyclically shifted which is represented as $P2 = (n_{CCE}+b) \bmod (N_{CCE}) + N^{(1)}_{PUUCH}$ in the form of modulo operation. The same principle may be applied to later embodiments.

In accordance with the above embodiment, additional signaling is not required, and a configuration can be simple.

Figure 13:
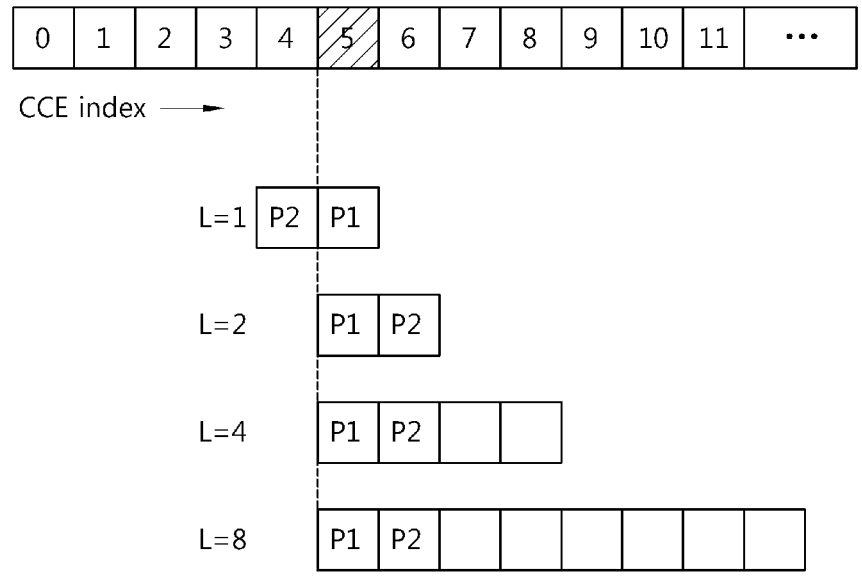
FIG. 13 is a diagram showing a method of determining a plurality of resources according to a second embodiment of the present invention.

FIG. 13 is a diagram showing a method of determining a plurality of resources according to a second embodiment of the present invention. In this method, if the CCE aggregation level is greater than or equal to the number of required ACK/NACK resources, second ACK/NACK resources are determined on the basis of a CCE index subsequent to the lowest CCE index. If the CCE aggregation level is less than the number of required ACK/NACK resources, insufficient ACK/NACK resources are determined on the basis of a CCE index previous to the lowest CCE index.

It is assumed that a CCE index 5 used to transmit a PDCCH for a downlink grant, from among CCE indices, is the lowest index. If the CCE aggregation level L is 2, 4, or 8, a first ACK/NACK resource index P1 is determined on the basis of the lowest CCE index 5 as in the existing method art, and a second ACK/NACK resource index P2 is determined on the basis of a CCE index 6 subsequent to the lowest CCE index 5. If the CCE aggregation level L is 1, a second ACK/NACK resource index P2 is determined on the basis of a CCE index 4 previous to the lowest CCE index 5. If the CCE index next to the lowest CCE index is larger than $N_{CCE}-1$, the CCE index next to the lowest CCE index may be set to 0 by using cyclic shift.

The first and second ACK/NACK resource indices are differently determined depending on the CCE aggregation level. If the CCE aggregation level is 2 or more, the first and second ACK/NACK resource indices are respectively defined as $P1=n_{CCE}+N^{(1)}_{PUUCH}$ and $P2=(n_{CCE}+1)+N^{(1)}_{PUUCH}$. If the CCE aggregation level is 1, the first and second ACK/NACK resource indices are respectively defined as $P1=n_{CCE}+N^{(1)}_{PUUCH}$ and $P2=(n_{CCE}-1)+N^{(1)}_{PUUCH}$.

Although the second ACK/NACK resource index P2 is illustrated to be determined on the basis of a CCE index previous or subsequent to the lowest CCE index, the second ACK/NACK resource index P2 may be determined using $P2=(n_{CCE}+b)+N^{(1)}_{PUUCH}$ or $P2=(n_{CCE}-b)+N^{(1)}_{PUUCH}$. Here, b is an integer.

If a subsequent CCE index is used to determine a second ACK/NACK resource index even though the CCE aggregation level is less than the number of required ACK/NACK resources, a collision with the ACK/NACK resources of other UEs can occur, and a scheduling load for a BS can be increased. This is because there is a high probability that a subsequent CCE index will become the lowest CCE index used to transmit the PDCCH of other UE. Accordingly, if a previous CCE index is used to determine a second ACK/NACK resource index, the probability of such collision can be reduced.

Figure 14:
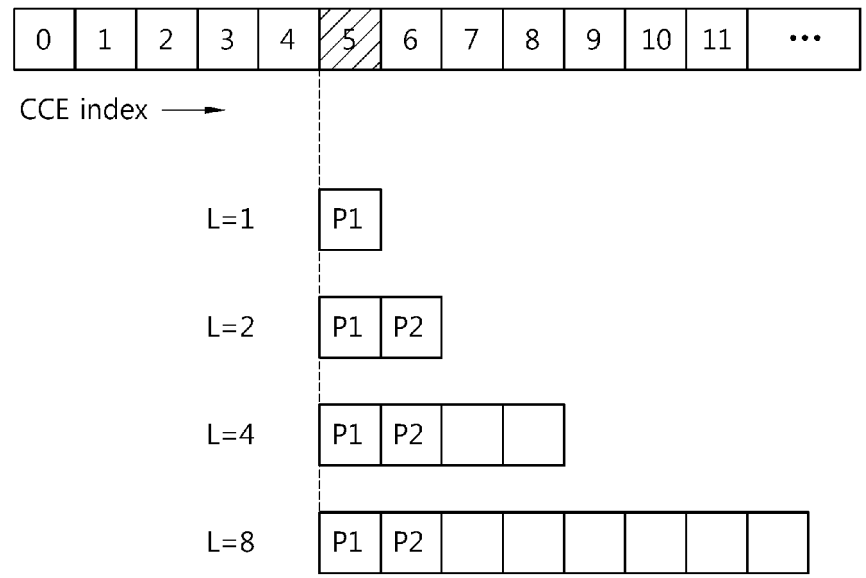
FIG. 14 is a diagram showing a method of determining a plurality of resources according to a third embodiment of the present invention.

FIG. 14 is a diagram showing a method of determining a plurality of resources according to a third embodiment of the present invention. In this method, if the CCE aggregation level is greater than or equal to the number of required ACK/NACK resources, a second ACK/NACK resource index is determined on the basis of a CCE index subsequent to the lowest CCE index. If the CCE aggregation level is less than the number of required ACK/NACK resources, a single antenna transmission mode is used.

It is assumed that a CCE index 5 of CCEs used to transmit PDCCHs is the lowest index. If the CCE aggregation level L is 2, 4, or 8, a first ACK/NACK resource index P1 is determined on the basis of the lowest CCE index 5 as in the existing method, and a second ACK/NACK resource index P2 is determined on the basis of a CCE index 6 subsequent to the lowest CCE index 5. If the CCE aggregation level L is 1, an ACK/NACK signal is transmitted through a single antenna using only first ACK/NACK resources because second ACK/NACK resources are not secured.

A multi-antenna transmission mode is activated or inactivated depending on the number of determined ACK/NACK resources. If the CCE aggregation level is 2 or more, the first and second ACK/NACK resource indices are respectively defined as $P1=n_{CCE}+N^{(1)}_{PUUCH}$ and $P2=(n_{CCE}+1)+N^{(1)}_{PUUCH}$. If the CCE aggregation level is 1, the multi-antenna transmission mode is automatically inactivated, and the single antenna transmission mode is activated.

Although the second ACK/NACK resource index P2 is illustrated to be determined on the basis of an next subsequent to the lowest CCE index, it can be determined like $P2=(n_{CCE}+b)+N^{(1)}_{PUUCH}$. Here, b is an integer.

To prevent ACK/NACK resources from colliding with each other, a BS can configure the CCE aggregation level so that it is less than the number of required ACK/NACK resources. For the purpose of the multi-antenna transmission mode, a BS transmits a PDCCH with the CCE aggregation level of at least 2 or more.

Figure 15:
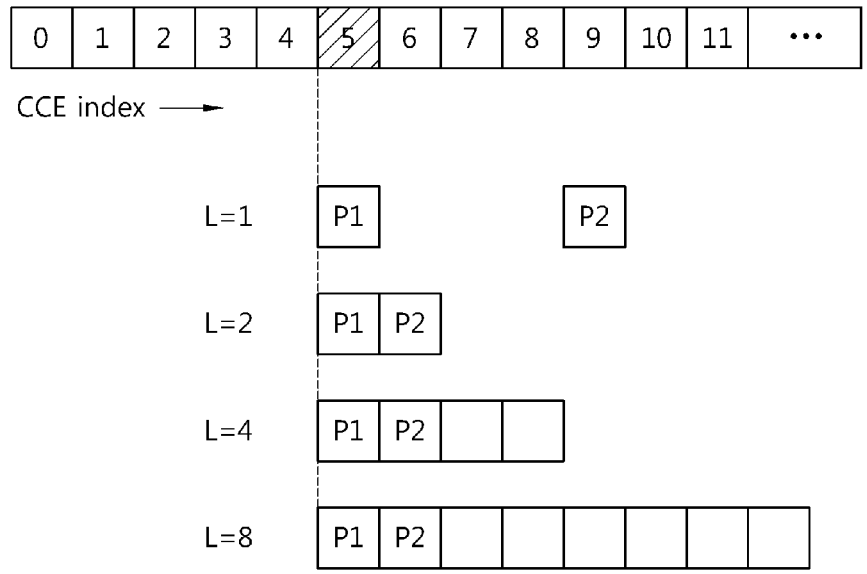
FIG. 15 is a diagram showing a method of determining a plurality of resources according to a fourth embodiment of the present invention.

FIG. 15 is a diagram showing a method of determining a plurality of resources according to a fourth embodiment of the present invention. If the CCE aggregation level is greater than or equal to the number of required ACK/NACK resources, a second ACK/NACK resource index is determined on the basis of a CCE index subsequent to the lowest CCE index. If the CCE aggregation level is less than the number of required ACK/NACK resources, additional set-up information is used.

It is assumed that a CCE index 5 of CCEs used to transmit PDCCHs is the lowest index. If the CCE aggregation level L is 2, 4, or 8, a first ACK/NACK resource index P1 is determined on the basis of the lowest CCE index 5 as in the existing method, and a second ACK/NACK resource index P2 is determined on the basis of a CCE index 6 subsequent to the lowest CCE index 5. Although the second ACK/NACK resource index P2 is illustrated to be determined on the basis of a CCE index subsequent to the lowest CCE index, the second ACK/NACK resource index P2 can be determined like $P2=(n_{CCE}+b)+N^{(1)}_{PUUCH}$. Here, b is an integer.

If the CCE aggregation level L is 1, a second ACK/NACK resource index P2 is determined based on set-up information. A UE uses the set-up information in order to determine additional ACK/NACK resources.

The set-up information can be pre-defined, or a BS can inform a UE of the set-up information. A BS can inform a UE of the set-up information as part of a DCI on a PDCCH, part of an upper layer message such as an RRC message, and/or part of system information such as SIB or MIB. The set-up information can include a second ACK/NACK resource index P2 itself or an offset $N_{offset}$ of a first ACK/NACK resource index P1. For example, $P2=P1+N_{offset}$.

Figure 16:
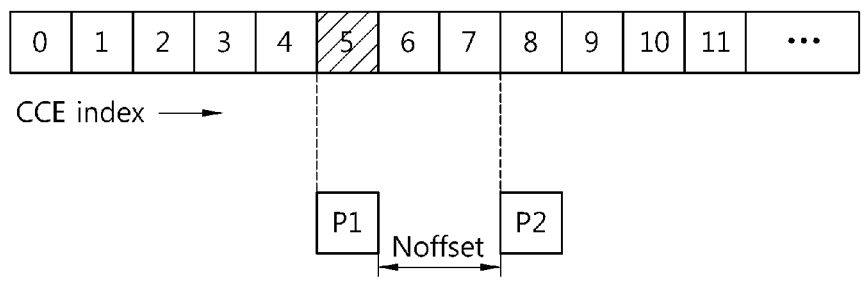
FIG. 16 is a diagram showing a method of determining a plurality of resources according to a fifth embodiment of the present invention.

FIG. 16 is a diagram showing a method of determining a plurality of resources according to a fifth embodiment of the present invention. In this method, a plurality of ACK/NACK resources is determined on the basis of the offset $N_{offset}$. TA first ACK/NACK resource index P1 and a second ACK/NACK resource index P2 can be expressed in $P2=P1+N_{offset}$.

The offset $N_{offset}$ can be a previously determined value. Alternatively, a BS can inform a UE of the offset $N_{offset}$. A BS can inform a UE of the offset $N_{offset}$ as a DCI, an RRC message and/or a part of system information. In the case in which a BS configure the offset $N_{offset}$, the BS can adjust the offset $N_{offset}$ in order to prevent ACK/NACK resources from colliding with each other between UEs.

If the offset $N_{offset}$ is dynamically scheduled by being included in the DCI, the BS may indicate whether the offset is included in the DCI or whether the offset is used via higher layer signalling.

The offset $N_{offset}$ may be a relative offset with other ACK/NACK resource index (or a CCE index) or an absolute offset.

If the offset $N_{offset}$ has a specific value, the multi-antenna transmission mode is inactivated, and what the single antenna transmission mode is performed through at least one allocated ACK/NACK resource can be indicated. For example, when the value of the offset $N_{offset}$ is set to '0', the ACK/NACK signal can be transmitted through a single antenna using one ACK/NACK resource.

The offset $N_{offset}$ can have a different value for every the CCE aggregation level or can have the same value irrespective of the CCE aggregation level.

The BS may inform the UE of the second ACK/NACK resource index P2 itself instead of the offset $N_{offset}$.

Figure 17:
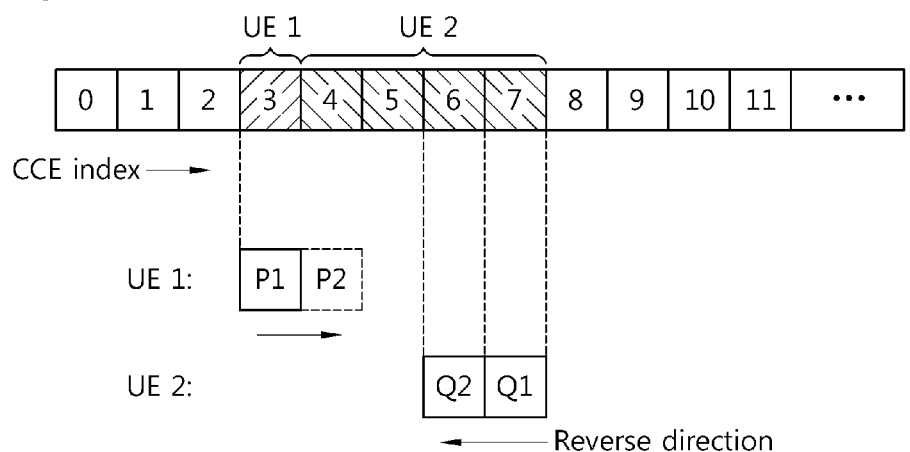
FIG. 17 is a diagram showing a method of determining a plurality of resources according to a sixth embodiment of the present invention.

FIG. 17 is a diagram showing a method of determining a plurality of resources according to a sixth embodiment of the present invention. In this method, a direction in which a plurality of ACK/NACK resources is determined is different in each UE. A UE 1 (UE 1) determines a first ACK/NACK resource index P1 and a second ACK/NACK resource index P2 as in the embodiment of FIG. 12. Here, if a UE 2 (UE 2) determines ACK/NACK resources in the same direction as the UE 1, the ACK/NACK resources will collide with each other. In other words, the second ACK/NACK resource index P2 of the UE 1 may overlap with the first ACK/NACK resource index Q1 of the UE 2.

To prevent such a collision between resources, the ACK/NACK resources of the UE 2 can be determined not on the basis of the lowest CCE index (i.e., a first CCE index), but on the basis of a CCE index (i.e., the last CCE index) having the highest index in a reverse direction. In the example of FIG. 17, an index of the last CCE of four CCEs used for PDCCH transmission of the UE 2 is 7. The first ACK/NACK resource index Q1 is determined on the basis of the last CCE index 7. A second ACK/NACK resource index Q2 is determined on the basis of a CCE index 6 previous to the last CCE index 7 in a reverse direction.

A BS can inform a UE of a direction in which resources are determined. When the above offset $N_{offset}$ has a specific value, a UE can indicate that ACK/NACK resources are determined in a reverse direction.

The above embodiments of FIGS. 12 to 17 can be expanded in order to determine a K (K>2) number of ACK/NACK resources. For example, if five ACK/NACK resource indices are necessary and the CCE aggregation level is 4 in the embodiment of FIG. 13, four ACK/NACK resource indices can be determined from four consecutive CCE indices, and the remaining one ACK/NACK resource index can be determined based on a previous CCE index.

Figure 18:
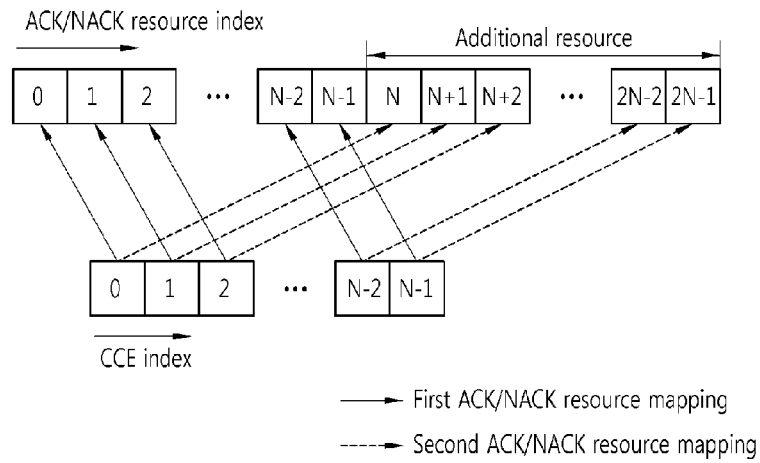
FIG. 18 is a diagram showing a method of determining a plurality of resources according to a seventh embodiment of the present invention.

FIG. 18 is a diagram showing a method of determining a plurality of resources according to a seventh embodiment of the present invention. In this method, additional resources are reserved for ACK/NACK resources.

Assuming that N available CCEs exist, an N number of resources can be reserved for first ACK/NACK resources, and the remaining resources can be reserved for second ACK/NACK resources. A first ACK/NACK resource index P1 can be directly determined on the basis of a corresponding CCE index. A second ACK/NACK resource index P2 can be determined by adding N to the first ACK/NACK resource index P1. That is, P2=P1+N. Here, N is the number of resources reserved for the first ACK/NACK resource index.

Figure 19:
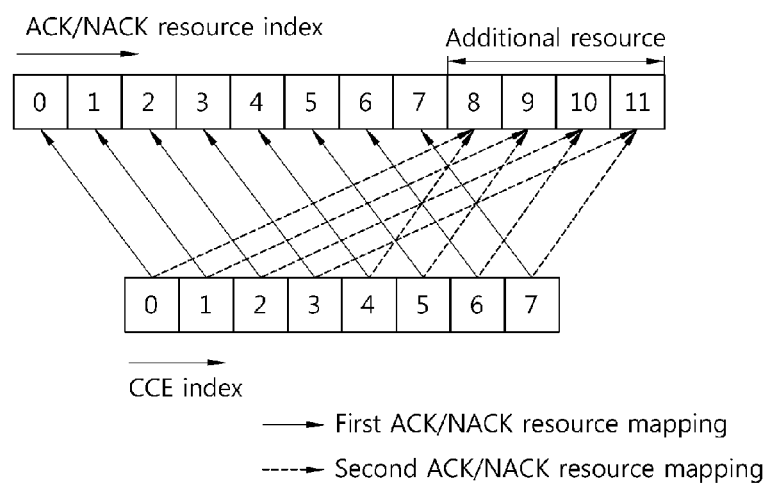
FIG. 19 is a diagram showing a method of determining a plurality of resources according to an eighth embodiment of the present invention.

FIG. 19 is a diagram showing a method of determining a plurality of resources according to an eighth embodiment of the present invention. In this method, when compared with the embodiment of FIG. 18, resources having a number less than the number of CCEs are reserved for a second ACK/NACK resource.

Assuming that an N number of available CCEs exist, an N number of resources can be reserved for first ACK/NACK resource, and an M (M<N) number of resources can be reserved for second ACK/NACK resources. A first ACK/NACK resource index P1 can be directly determined on the basis of a corresponding CCE index. A second ACK/NACK resource index P2 can be expressed in (P1 mod M)+N on the basis of the first ACK/NACK resource index P1. Here, 'mod' indicates the modulo operation, and M indicates the number of resources reserved for the second ACK/NACK resource index.

A BS can inform a UE of M as upper layer signaling, such as an RRC message, or a part of system information, such as MIB or SIB.

Figure 20:
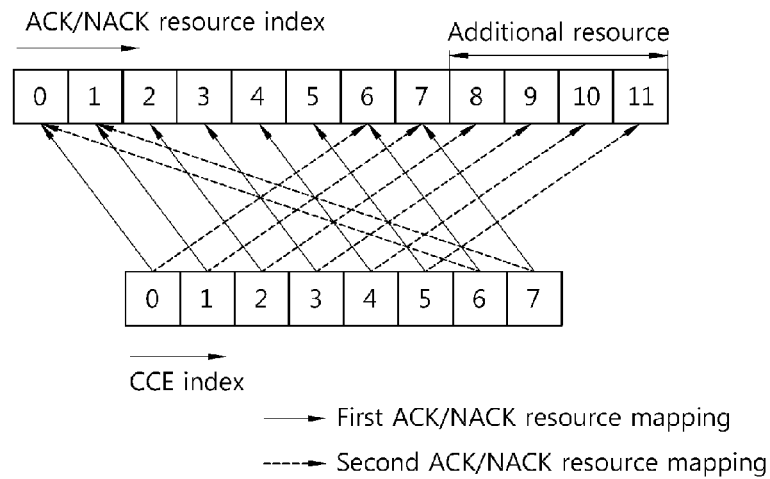
FIG. 20 is a diagram showing a method of determining a plurality of resources according to a ninth embodiment of the present invention.

FIG. 20 is a diagram showing a method of determining a plurality of resources according to a ninth embodiment of the present invention. In this method, as compared with the embodiment of FIG. 19, second ACK/NACK resources are uniformly allocated to not only additional resources, but all the resources.

It is assumed that when there are an N number of available CCEs, an N number of resources are reserved for first ACK/NACK resources and an M number of additional resources exist. A first ACK/NACK resource index P1 can be directly determined on the basis of a corresponding CCE index. A second ACK/NACK resource index P2 can be expressed using P2=[P1+floor{(N+M)/2}] mod(M+N). Here, floor(x) indicates the greatest integer smaller than x. M is the number of additional resources. A BS can inform a UE of M.

In the embodiments of FIGS. 18 to 20, the indices or arrangements of additional resources are only illustrative, and are not limited to the embodiments. The additional resources may be placed at the front stage of resources reserved for the first ACK/NACK resources.

The embodiments of FIGS. 18 to 20 can be expanded to the determination of a K (K>2) number of ACK/NACK resources. For example, in the case in which four ACK/NACK resource indices are necessary, additional resources can be classified into three regions.

Figure 21:
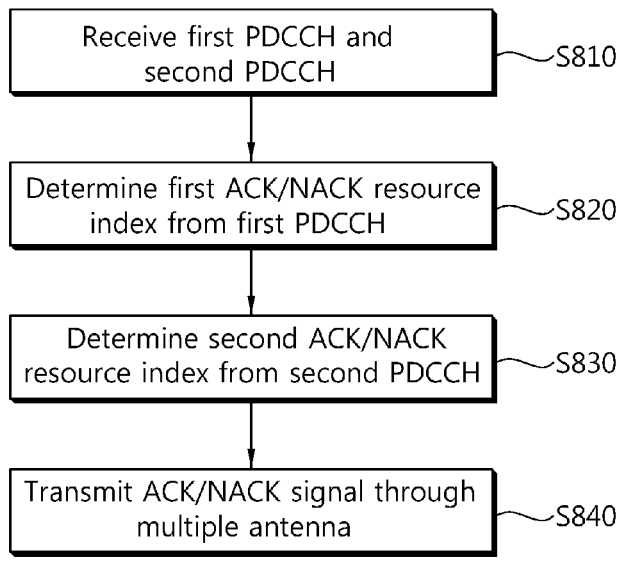
FIG. 21 is a diagram showing a method of determining a plurality of resources according to a tenth embodiment of the present invention.

FIG. 21 is a diagram showing a method of determining a plurality of resources according to a tenth embodiment of the present invention. This method shows an example in which ACK/NACK resources are determined on the basis of not only resources used to transmit a PDCCH carrying a downlink grant, but resources used to transmit a PDCCH carrying an uplink grant.

A UE receives a first PDCCH carrying a downlink grant and a second PDCCH carrying an uplink grant at step S810. The first PDCCH and the second PDCCH can be received in the same subframe or can be received in different subframe.

The UE determines a first ACK/NACK resource index on the basis of resources allocated to the first PDCCH (i.e., the lowest CCE index used to transmit the first PDCCH) at step S820.

The UE determines a second ACK/NACK resource index on the basis of resources allocated to the second PDCCH (i.e., the lowest CCE index used to transmit the second PDCCH) at step S830.

The UE transmits an ACK/NACK signal through a first antenna using the first ACK/NACK resources and transmits the ACK/NACK signal through a second antenna using the second ACK/NACK resources at step S840.

If required ACK/NACK resources cannot be determined from the first PDCCH carrying the downlink grant, insufficient ACK/NACK resources can be determined from the second PDCCH carrying the uplink grant. For example, if the first PDCCH is transmitted through two CCEs, two ACK/

NACK resources can be determined using one of the embodiments of FIGS. 12 to 16 from the two CCEs. If the first PDCCH is transmitted through only one CCE, a first ACK/NACK resource index can be determined from the CCE of the first PDCCH, and a second ACK/NACK resource index can be determined from the second PDCCH.

In the above-described embodiments, if the number of required ACK/NACK resources is greater than the number of determined ACK/NACK resources, the determined ACK/NACK resources can be overlappingly allocated. For example, assuming that four ACK/NACK resources are required for four antennas, first and second ACK/NACK resource indices are determined using one of the above-described embodiments, the first ACK/NACK resource index is used as a third ACK/NACK resource index, and the second ACK/NACK resource index is used as a fourth ACK/NACK resource index.

The embodiments of FIGS. 12 to 21 for determining the plurality of resources may be independently implemented, but may be implemented in combination.

When the embodiments of FIGS. 12 to 21 are implemented in combination, priority may be given. For example, 'use of CCE-1 (the embodiment of FIG. 13)' has highest priority, 'use of uplink grant (the embodiment of FIG. 21)' has next priority, and 'use of $N_{offset}$ (the embodiment of FIG. 16)' has lowest priority. The priorities may be pre-defined. Or the BS may inform the UE of the priorities.

When the embodiments of FIGS. 12 to 21 are implemented in combination, the BS may inform the UE of a selection field which indicates which resource is used. For example, the BS may configure two schemes to determine resources, i.e. 'use of CCE-1 (the embodiment of FIG. 13)' and 'use of $N_{offset}$'. Here, the $N_{offset}$, which may be transmitted from the BS to the UE, may be an offset value for the first CCE in the embodiment of FIG. 16 or P2 itself. Then, the BS can transmit, to the UE, the selection field on a PDCCH dynamically in order to indicate which scheme is used to determine ACK/NACK resources. Same principle may be applied when a plurality of resource are pre-configured, i.e. {$N_{offset}$, CCE-1, CCE+2}. Amount of reserved ACK/NACK resources may be reduced by allocating overlapped ACK/NACK resources via high layer signaling. The collision of the overlapped ACK/NACK resources can be avoided by dynamic scheduling via PDCCH.

Figure 22:
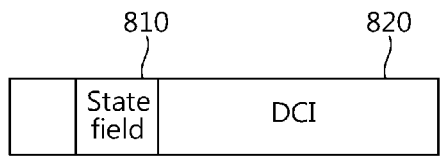
FIG. 22 is a diagram showing an example of a bit field added to a DCI.

FIG. 22 is a diagram showing an example of a bit field added to a DCI. A state field 810 can be added to an existing DCI 820, or the bit field of an existing DCI 820 can be reused.

The state field 810 can be a bit field, indicating the toggle of a first method of determining a plurality of ACK/NACK resources without additional signaling, as in the embodiments of FIGS. 12 to 14, or the toggle of a second method of determining a plurality of ACK/NACK resources based on signaling information, as in the embodiments of FIGS. 15 to 17.

The state field 810 can be a bit field indicating one state of a single antenna transmission state of an ACK/NACK signal and a multi-antenna transmission state of the ACK/NACK signal. If the multi-antenna transmission state is configured, a UE can acquire a plurality of ACK/NACK resources using at least one of the embodiments of FIGS. 12 to 21.

Figure 23:
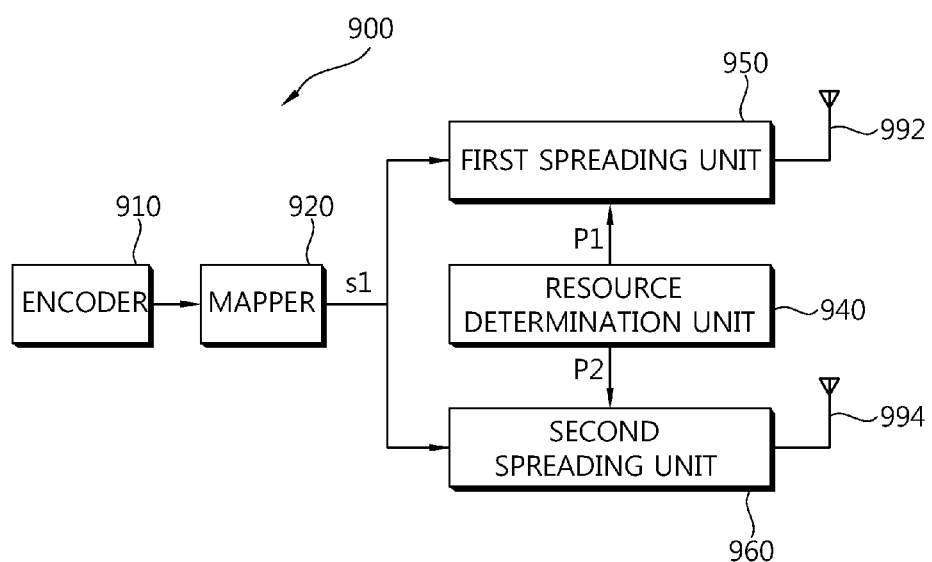
FIG. 23 is a block diagram of an apparatus for transmitting an ACK/NACK signal according to an embodiment of the present invention.

FIG. 23 is a block diagram of an apparatus for transmitting an ACK/NACK signal according to an embodiment of the present invention. A wireless apparatus 900 includes an encoder 910, a mapper 920, a resource determination unit 940, a first spreading unit 950, a second spreading unit 960, and two transmit antennas 992 and 994.

The encoder 910 receives information bit and generates encoded bits. Assuming that an ACK/NACK signal of 1 bit is necessary for a transport block, the amount of information bits of the ACK/NACK signal for a first transport block and a second transport block is 2 bits. An encoded ACK/NACK signal of 2 bits can be obtained using the 2 bits as encoded bits.

The mapper 920 generates a modulation symbol s1 by mapping the encoded bits in the form of a constellation. Hereinafter, the modulation symbol is assumed to be a complex-valued symbol indicating a position on the constellation of a corresponding encoded bit, but may be expressed in various forms in accordance with the implementation methods.

The resource determination unit 940 determines a plurality of ACK/NACK resources using the above-described methods. The resource determination unit 940 determines a first ACK/NACK resource index P1 and a second ACK/NACK resource index P2.

The first spreading unit 950 configures a first PUCCH on the basis of the first ACK/NACK resource index P1 and transmits the modulation symbol s1 through the first transmit antenna 992 by spreading the modulation symbol s1 on the first PUCCH.

The second spreading unit 960 configures a second PUCCH on the basis of the second ACK/NACK resource index P2 and transmits the modulation symbol s1 through the second transmit antenna 994 by spreading the modulation symbol s1 on the second PUCCH.

Although the two transmit antennas and the two ACK/NACK resources are illustrated as an example, the radio apparatus 900 can include two or more transmit antennas.

Figure 24:
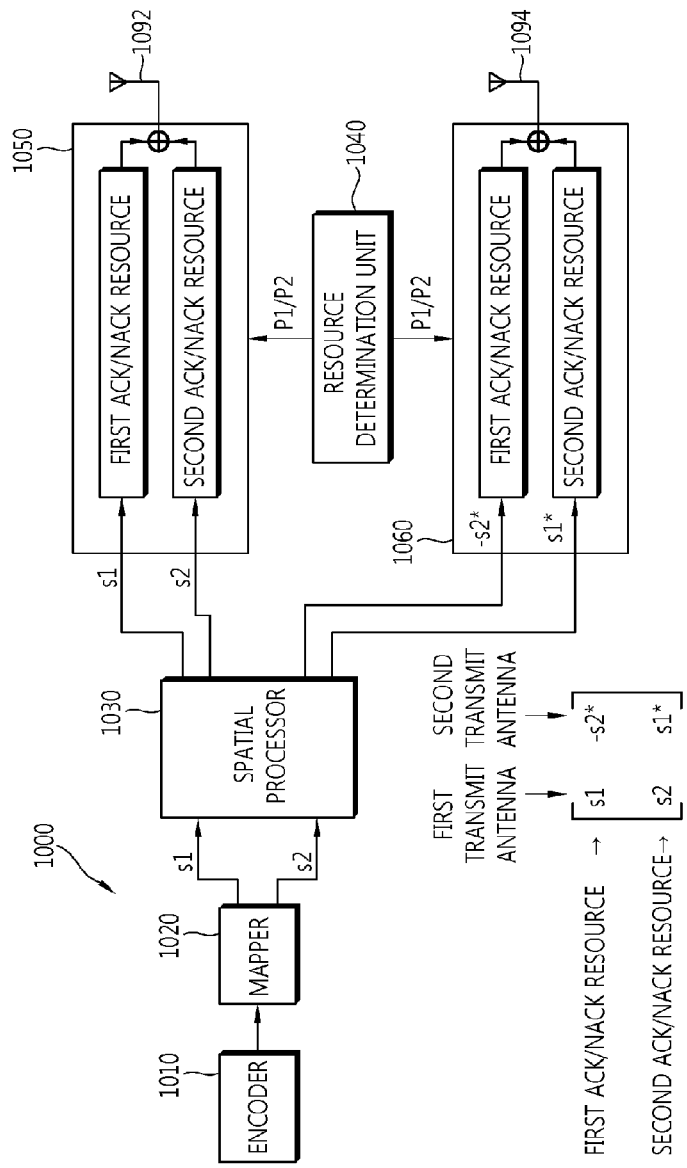
FIG. 24 is a block diagram of an apparatus for transmitting an ACK/NACK signal according to another embodiment of the present invention.

FIG. 24 is a block diagram of an apparatus for transmitting an ACK/NACK signal according to another embodiment of the present invention. A wireless apparatus 1000 includes an encoder 1010, a mapper 1020, a spatial processor 1030, a resource determination unit 1040, a first spreading unit 1050, a second spreading unit 1060, and two transmit antennas 1092 and 1094.

The encoder 1010 receives information bit and generates encoded bits. Assuming that an ACK/NACK signal of 1 bit is necessary for a transport block, the amount of information bits of the ACK/NACK signal for a first transport block and a second transport block is 2 bits. An encoded ACK/NACK signal of 2 bits can be obtained using the 2 bits as encoded bits.

The mapper 1020 generates modulation symbols s1 and s2 by mapping the encoded bits in the form of a constellation. The spatial processor 1030 performs SCBC (Space-Code Block Code) processing on the modulation symbols s1 and s2 and transmits the processed modulation symbols to the first spreading unit 1050 and the second spreading unit 1060.

The spatial processor 1030 can use at least any one of the SCBCs listed in the following table 1. In Table 4, ( )* is a complex conjugate.

TABLE 4

| (1) | $\begin{pmatrix} s_1 & s_2 \\ -s_2^* & s_1^* \end{pmatrix}$ |
|---|---|
| (2) | $\begin{pmatrix} s_1 & -s_2 \\ s_2^* & s_1^* \end{pmatrix}$ |

TABLE 4-continued

| | |
|---|---|
| (3) | $\begin{pmatrix} s_1^* & s_2 \\ -s_2^* & s_1 \end{pmatrix}$ |
| (4) | $\begin{pmatrix} s_1^* & -s_2 \\ s_2^* & s_1 \end{pmatrix}$ |
| (5) | $\begin{pmatrix} s_1 & s_2^* \\ -s_2 & s_1^* \end{pmatrix}$ |
| (6) | $\begin{pmatrix} s_1 & -s_2^* \\ s_2 & s_1^* \end{pmatrix}$ |
| (7) | $\begin{pmatrix} s_1^* & s_2^* \\ -s_2 & s_1 \end{pmatrix}$ |
| (8) | $\begin{pmatrix} s_1^* & -s_2^* \\ s_2 & s_1 \end{pmatrix}$ |
| (9) | $\begin{pmatrix} s_1 & s_2 \\ s_2^* & -s_1^* \end{pmatrix}$ |
| (10) | $\begin{pmatrix} -s_1 & s_2 \\ s_2^* & s_1^* \end{pmatrix}$ |
| (11) | $\begin{pmatrix} s_1 & s_2^* \\ s_2 & -s_1^* \end{pmatrix}$ |
| (12) | $\begin{pmatrix} -s_1 & s_2^* \\ s_2 & s_1^* \end{pmatrix}$ |
| (13) | $\begin{pmatrix} s_1^* & s_2 \\ s_2^* & -s_1 \end{pmatrix}$ |
| (14) | $\begin{pmatrix} -s_1^* & s_2 \\ s_2^* & s_1 \end{pmatrix}$ |
| (15) | $\begin{pmatrix} s_1^* & s_2^* \\ s_2 & -s_1 \end{pmatrix}$ |
| (16) | $\begin{pmatrix} -s_1^* & s_2^* \\ s_2 & s_1 \end{pmatrix}$ |

Alternatively, the SCBCs can be defined as in the following table so that one ACK/NACK resource can be used for one antenna.

TABLE 5

| | |
|---|---|
| (1) | $\begin{pmatrix} s_1 & 0 \\ 0 & s_1^* \end{pmatrix}$ |
| (2) | $\begin{pmatrix} s_1^* & 0 \\ 0 & s_1 \end{pmatrix}$ |
| (3) | $\begin{pmatrix} s_1 & 0 \\ 0 & -s_1^* \end{pmatrix}$ |
| (4) | $\begin{pmatrix} s_1^* & 0 \\ 0 & -s_1 \end{pmatrix}$ |
| (5) | $\begin{pmatrix} -s_1 & 0 \\ 0 & s_1^* \end{pmatrix}$ |
| (6) | $\begin{pmatrix} -s_1^* & 0 \\ 0 & s_1 \end{pmatrix}$ |
| (7) | $\begin{pmatrix} 0 & s_2 \\ -s_2^* & 0 \end{pmatrix}$ |
| (8) | $\begin{pmatrix} 0 & s_2^* \\ -s_2 & 0 \end{pmatrix}$ |
| (9) | $\begin{pmatrix} 0 & -s_2 \\ s_2^* & 0 \end{pmatrix}$ |
| (10) | $\begin{pmatrix} 0 & -s_2^* \\ s_2 & 0 \end{pmatrix}$ |
| (11) | $\begin{pmatrix} 0 & s_2 \\ s_2^* & 0 \end{pmatrix}$ |
| (12) | $\begin{pmatrix} 0 & s_2^* \\ s_2 & 0 \end{pmatrix}$ |

Each of rows of the SCBC matrix indicates resources (i.e., ACK/NACK resources), and each of columns of the SCBC matrix indicates an antenna. The first column indicates a first antenna, and the second column indicates a second antenna. The first row indicates first ACK/NACK resources, and the second row indicates second ACK/NACK resources.

It is assumed that the SCBC (6) in Table 4 is used.

The resource determination unit 1040 determines a plurality of ACK/NACK resources using the above-described methods. The resource determination unit 1040 determines a first ACK/NACK resource index P1 and a second ACK/NACK resource index P2.

The first spreading unit 1050 transmits the modulation symbol s1 using the first ACK/NACK resources and the modulation symbol s2 using the second ACK/NACK resources through the first transmit antenna 1092.

The second spreading unit 1060 transmits the modulation symbol −s2* using the first ACK/NACK resources and the modulation symbol s1* using the second ACK/NACK resources through the second transmit antenna 1094.

Although the two transmit antennas and the two ACK/NACK resources are illustrated as an example, the radio apparatus 1000 can include two or more transmit antennas.

Figure 25:
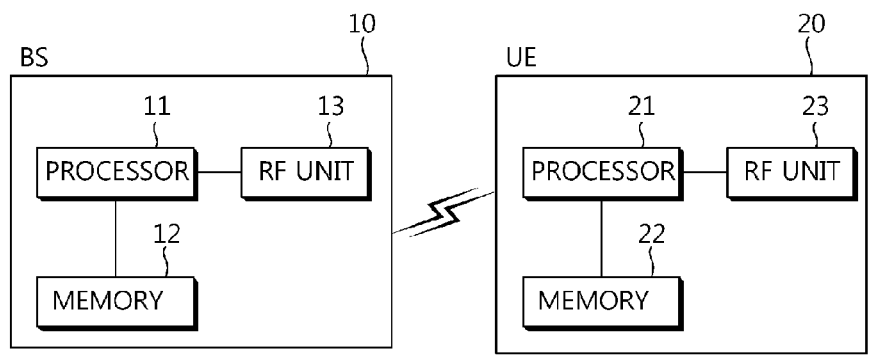
FIG. 25 is a block diagram of a wireless communication system in which the embodiments of the present invention are implemented.

FIG. 25 is a block diagram showing a wireless communication system for implementing an embodiment of the present invention.

A BS 10 includes a processor 11, a memory 12, and a radio frequency (RF) unit 13.

The processor 11 implements the proposed functions, processes, and/or methods. The aforementioned operation of the BS 10 may be implemented by the processor 11. The processor 11 may configure a downlink physical channel and may perform HARQ.

The memory 12 is coupled to the processor 11, and stores a protocol or parameter for the HARQ operation. The RF unit 13 is coupled to the processor 11, and transmits and/or receives a radio signal.

A UE 20 includes a processor 21, a memory 22, and an RF unit 23.

The processor 21 implements the proposed functions, processes, and/or methods. The aforementioned operation of the UE 20 may be implemented by the processor 21. The processor 21 may acquire a plurality of resources and may transmit a HARQ ACK/NACK signal using the plurality of resources via multiple antennas.

The memory 22 is coupled to the processor 21, and stores a protocol or parameter for the HARQ operation. The RF unit 23 is coupled to the processor 21, and transmits and/or receives a radio signal.

The processors 11, 21 may include application-specific integrated circuit (ASIC), other chipset, logic circuit and/or data processing device. The memories 12, 22 may include read-only memory (ROM), random access memory (RAM), flash memory, memory card, storage medium and/or other storage device. The RF units 13, 23 may include baseband circuitry to process radio frequency signals. When the embodiments are implemented in software, the techniques described herein can be implemented with modules (e.g., procedures, functions, and so on) that perform the functions described herein. The modules can be stored in memories 12, 22 and executed by processors 11, 21. The memories 12, 22 can be implemented within the processors 11, 21 or external to the processors 11, 21 in which case those can be communicatively coupled to the processors 11, 21 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting an ACK/NACK signal for hybrid automatic repeat request in a wireless communication system, the method comprising:
receiving, by a user equipment (UE), a downlink allocation on a downlink control channel;
receiving, by the UE, at least one downlink transport block by using the downlink allocation;
determining, at the UE, a first ACK/NACK resource index and a second ACK/NACK resource index;
transmitting, at the UE, an ACK/NACK signal for the at least one downlink transport block by using a first uplink resource indicated by the first ACK/NACK resource index through a first antenna to a base station; and
transmitting, at the UE, the ACK/NACK signal for the at least one downlink transport block by using a second uplink resource indicated by the second ACK/NACK resource index through a second antenna to the base station,
wherein the first ACK/NACK resource index for the first antenna is determined based on resources used for the downlink control channel and the second ACK/NACK resource index for the second antenna is determined based on a value, which is equal to a summation of the first ACK/NACK resource index and an integer,
wherein the resources used for the downlink control channel include at least one control channel element (CCE), and the first ACK/NACK resource index is a lowest CCE index among CCE indices for the downlink control channel,
wherein the second ACK/NACK resource index is a CCE index subsequent to the lowest CCE index,
wherein the downlink allocation is received in a k-th subframe and the ACK/NACK signal is transmitted in a (k+4)th subframe through the first and second antennas, and
wherein the first uplink resource is used for configuring a first physical uplink control channel (PUCCH) and the second uplink resource is used for configuring a second PUCCH.

2. The method of claim 1, wherein the downlink control channel is a physical downlink control channel (PDCCH).

3. An apparatus for transmitting an ACK/NACK signal for hybrid automatic repeat request in a wireless communication system, the apparatus comprising:
a radio frequency unit configured to transmit and receive a radio signal; and
a processor operatively coupled to the radio frequency unit, wherein the processor is configured to:
receive a downlink allocation on a downlink control channel;
receive at least one downlink transport block by using the downlink allocation;
determine a first ACK/NACK resource index and a second ACK/NACK resource index;
transmit an ACK/NACK signal for the at least one downlink transport block by using a first uplink resource indicated by the first ACK/NACK resource index through a first antenna to a base station; and
transmit the ACK/NACK signal for the at least one downlink transport block by using a second uplink resource indicated by the second ACK/NACK resource index through a second antenna to the base station,
wherein the first ACK/NACK resource index for the first antenna is determined based on resources used for the downlink control channel and the second ACK/NACK resource index for the second antenna is determined based on a value, which is equal to a summation of the first ACK/NACK resource index and an integer,
wherein the resources used for the downlink control channel include at least one control channel element (CCE), and the first ACK/NACK resource index is a lowest CCE index among CCE indices for the downlink control channel,
wherein the second ACK/NACK resource index is a CCE index subsequent to the lowest CCE index,
wherein the downlink allocation is received in a k-th subframe and the ACK/NACK signal is transmitted in a (k+4)th subframe through the first and second antennas, and wherein the first uplink resource is used for configuring a first physical uplink control channel (PUCCH) and the second uplink resource is used for configuring a second PUCCH.

4. The apparatus of claim 3, wherein the downlink control channel is a physical downlink control channel (PDCCH).

* * * * *